(12) United States Patent
Suzuki

(10) Patent No.: US 11,845,344 B2
(45) Date of Patent: Dec. 19, 2023

(54) CAPACITOR MODULE, AND INVERTER DEVICE, MOTOR MODULE, AND VEHICLE INCLUDING THE CAPACITOR MODULE

(71) Applicant: NIDEC CORPORATION, Kyoto (JP)

(72) Inventor: Keiichi Suzuki, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 0 days.

(21) Appl. No.: 17/751,668

(22) Filed: May 24, 2022

(65) Prior Publication Data
US 2022/0410726 A1    Dec. 29, 2022

(30) Foreign Application Priority Data
Jun. 25, 2021 (JP) .................................. 2021-105346

(51) Int. Cl.
*H01G 4/33* (2006.01)
*B60L 50/40* (2019.01)
*H01G 4/224* (2006.01)

(52) U.S. Cl.
CPC .............. *B60L 50/40* (2019.02); *H01G 4/224* (2013.01); *B60L 2210/40* (2013.01)

(58) Field of Classification Search
CPC ............................ B60L 50/40; B60L 2210/40
See application file for complete search history.

(56) References Cited

U.S. PATENT DOCUMENTS

| | | | |
|---|---|---|---|
| 7,869,193 B2 | 1/2011 | Nohara et al. | |
| 8,269,331 B2 * | 9/2012 | Furuta | H01L 24/33 257/E23.057 |
| 10,978,248 B2 | 4/2021 | Koyama et al. | |
| 2010/0039748 A1 | 2/2010 | Fujii et al. | |
| 2011/0019136 A1 * | 1/2011 | Ogawa | G02F 1/133512 349/113 |
| 2016/0203915 A1 * | 7/2016 | Nishiyama | H02M 7/537 361/301.4 |
| 2017/0229246 A1 * | 8/2017 | Nishiyama | H01G 4/40 |
| 2018/0269002 A1 * | 9/2018 | Yamazaki | B60L 50/51 |

FOREIGN PATENT DOCUMENTS

| | | | |
|---|---|---|---|
| JP | 2008288242 A | 11/2008 | |
| JP | 2010251400 A | 11/2010 | |
| JP | 202127173 A | 2/2021 | |

* cited by examiner

*Primary Examiner* — Jared Fureman
*Assistant Examiner* — Esayas G Yeshaw
(74) *Attorney, Agent, or Firm* — HAUPTMAN HAM, LLP

(57) ABSTRACT

Provided is a capacitor module in which a plurality of film capacitor cells and a pair of bus bars are housed in a metal case to be integrated with a resin added in the metal case, and an electrical insulating film is formed at least on an inner surface of the metal case or each of outer surfaces of the pair of bus bars. The capacitor module is provided in an inverter device including an inverter circuit that converts DC power into AC power. The inverter device is provided in a motor module including an AC motor rotationally driven by AC power supplied from the inverter device, and the motor module is provided in a vehicle including an electric drive system.

12 Claims, 6 Drawing Sheets

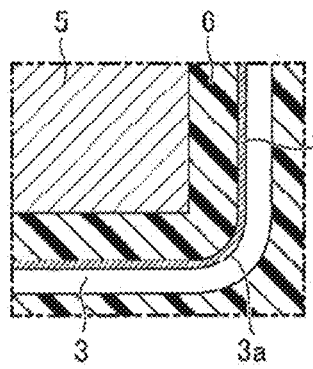 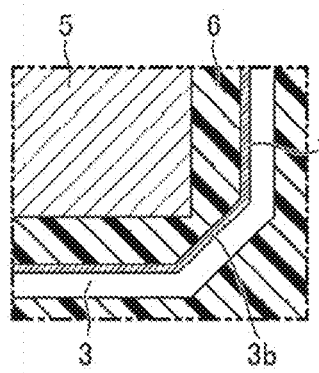 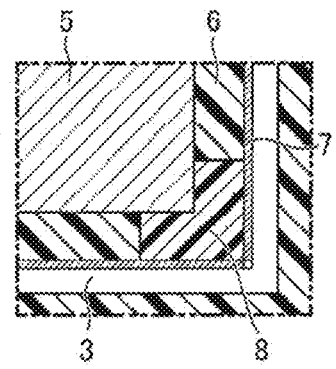
Fig. 5A  Fig. 5B  Fig. 5C
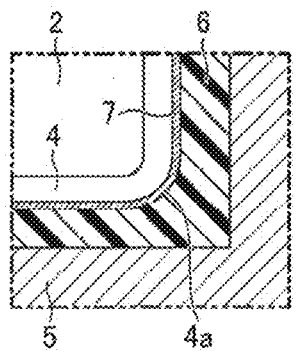 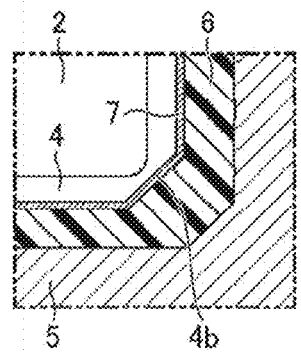 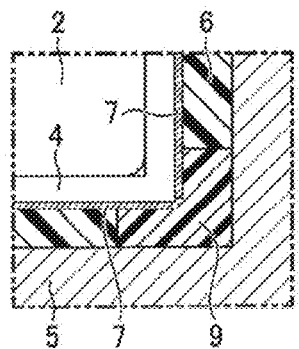
Fig. 6A  Fig. 6B  Fig. 6C

CAPACITOR MODULE, AND INVERTER DEVICE, MOTOR MODULE, AND VEHICLE INCLUDING THE CAPACITOR MODULE

CROSS-REFERENCE TO RELATED APPLICATIONS

The present invention claims priority under 35 U.S.C. § 119 to Japanese Patent Application No. 2021-105346 filed on Jun. 25, 2021, the entire content of which is incorporated herein by reference.

FIELD OF THE INVENTION

The present invention relates to a capacitor module configured by electrically connecting a plurality of film capacitor cells with a pair of bus bars, and an inverter device, a motor module, and a vehicle including the capacitor module.

BACKGROUND

An electric drive system used in an electric vehicle (EV vehicle), a hybrid vehicle (HEV vehicle), various industrial apparatuses, and the like includes a battery that is a DC power supply, an inverter device that is a power conversion device, an AC motor that is an electric motor, and the like. Vehicles and various apparatuses including such an electric drive system are each configured such that DC power supplied from a battery is converted into AC power by an inverter device, and an AC motor is rotationally driven by the AC power to obtain required power.

Although an inverter device includes a capacitor module for smoothing DC power, this capacitor module is required to have large capacity, high rated voltage, and large current resistance. This requirement causes the capacitor module to exclusively use a film capacitor having high rated voltage and excellent current resistance performance. Specifically, the capacitor module is configured, for example, as illustrated in a longitudinal sectional view of FIG. 11, such that a plurality of (three in the illustrated example) film capacitor cells 102 is electrically connected by a pair of bus bars 103 and 104 different in polarity and is housed in a resin case 105 together with the bus bars 103 and 104, and resin 106 having high electrical insulation properties is added in the resin case 105 to integrate the film capacitor cells 102 and the bus bars 103 and 104 as a case molded capacitor.

Unfortunately, a conventional capacitor module 101 illustrated in FIG. 11 has a problem of an increase in thickness by a thickness of the resin case 105 because the resin case 105 electrically insulates the film capacitor cells from an inverter case 110 for accommodating the capacitor module 101. Additionally, thermal interface material (TIM) material 111 for heat dissipation is interposed between the resin case 105 and the inverter case 110, so that the capacitor module 101 is excessively increased in thickness by a thickness of the TIM material 111 to cause an inverter device and a motor module including the capacitor module 101 to increase in size, and thus causing a problem of deterioration in mountability of the inverter device and the motor module on a vehicle, for example.

SUMMARY

An exemplary capacitor module according to the present invention includes: a plurality of film capacitor cells; a pair of bus bars that electrically connects the film capacitor cells in parallel; a metal case that houses the plurality of film capacitor cells and the pair of bus bars; a resin added in the metal case to integrate the plurality of film capacitor cells and the pair of bus bars; and an electrical insulating film formed at least on an inner surface of the metal case or each of outer surfaces of the pair of bus bars.

An exemplary inverter device according to the present invention converts DC power supplied from a DC power supply into AC power and includes: the capacitor module; an inverter circuit that converts the DC power into the AC power; and an inverter case that is partly formed by the metal case of the capacitor module.

An exemplary motor module according to the present invention includes: the inverter device; and an AC motor rotationally driven by AC power supplied from the inverter device.

An exemplary vehicle according to the present invention includes the motor module in an electric drive system.

The above and other elements, features, steps, characteristics and advantages of the present disclosure will become more apparent from the following detailed description of the preferred embodiments with reference to the attached drawings.

BRIEF DESCRIPTION OF THE DRAWINGS

FIGS. 5A to 5C are enlarged detailed views of a part C of FIG. 4, illustrating various processing forms of a corner of a bus bar;

FIGS. 6A to 6C are enlarged detailed views of a part D of FIG. 4, illustrating various processing forms of a corner of a bus bar;

DETAILED DESCRIPTION

Hereinafter, embodiments of the present invention will be described with reference to the drawings.

Figure 1:
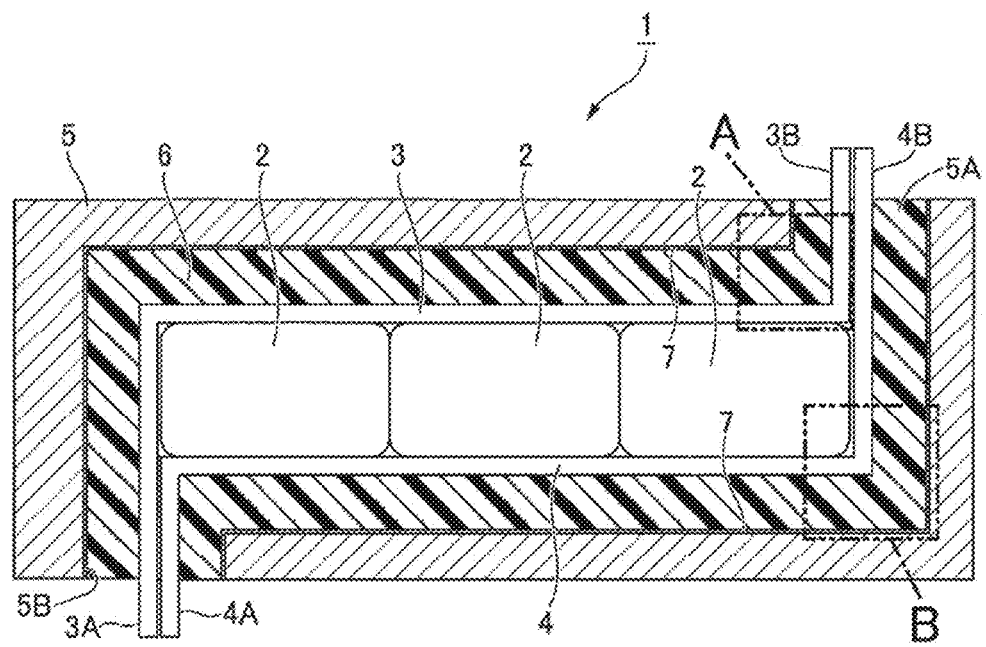
FIG. 1 is a longitudinal sectional view of a capacitor module according to a first embodiment of the present invention.
Figure 2A:
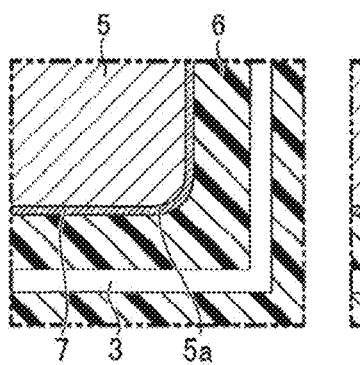
FIGS. 2A to 2C are enlarged detailed views of a part A of FIG. 1, illustrating various processing forms of an inner surface corner of a metal case.
Figure 2B:
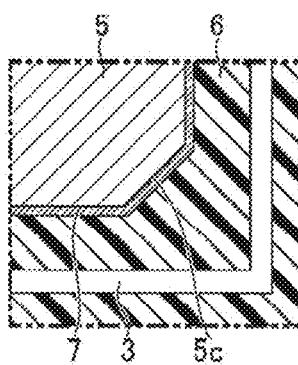
Figure 2C:
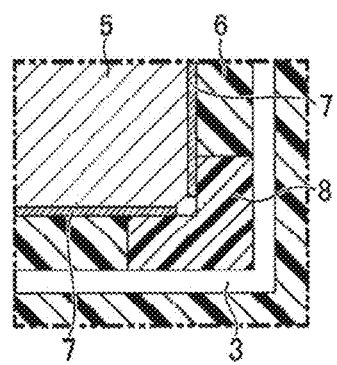
Figure 3A:
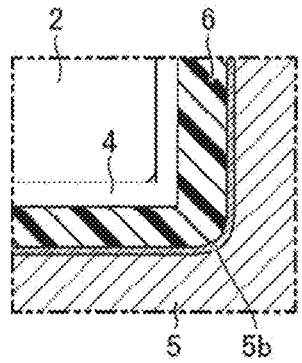
FIGS. 3A to 3C are enlarged detailed views of a part B of FIG. 1, illustrating various processing forms of an inner surface corner of a metal case.
Figure 3B:
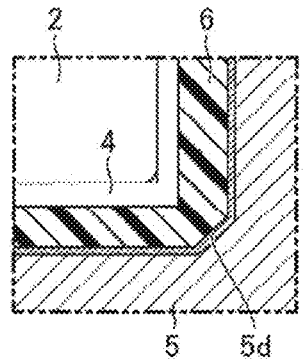
Figure 3C:
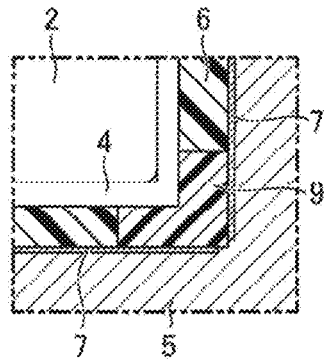

FIG. 1 is a longitudinal sectional view of a capacitor module according to a first embodiment of the present invention, FIGS. 2A to 2C are enlarged detailed views of a part A of FIG. 1, illustrating various processing forms of an inner surface corner of a metal case, and FIGS. 3A to 3C are enlarged detailed views of a part B of FIG. 1, illustrating various processing forms of an inner surface corner of a metal case.

As illustrated in FIG. 1, a capacitor module according to the present embodiment includes: a plurality (three in the illustrated example) of film capacitor cells 2; a pair of bus bars 3 and 4 that electrically connects the film capacitor cells in parallel; a metal case 5 that houses the plurality of film capacitor cells 2 and the pair of bus bars; and a resin 6 added in the metal case 5 to integrate the plurality of film capacitor cells 2 and the pair of bus bars 3 and 4.

Although not illustrated, each of the film capacitor cells 2 is obtained by providing vapor deposited metal electrodes made of aluminum, zinc, or the like on a dielectric film made of polyethylene terephthalate (PET), polypropylene (PP), or the like, and winding the dielectric film to allow the vapor deposited metal electrodes to face each other with the dielectric film interposed therebetween, and includes opposite end surfaces provided with respective metallikon electrodes made of metal such as zinc or tin that is sprayed.

The pair of bus bars 3 and 4 is composed of a copper plate or the like, and includes the bus bar 3 serving as a P-pole bus bar, and the bus bar 4 serving as an N-pole bus bar. The P-pole bus bar 3 and the N-pole bus bar 4 are electrically connected to the corresponding metallikon electrodes (not illustrated) formed on the respective opposite end surfaces of each of the film capacitor cells 2 by soldering. The P-pole bus bar 3 includes end parts 3A and 3B, and the N-pole bus bar 4 includes end parts 4A and 4B. The end parts 3A and 3B, and the end parts 4A and 4B, are formed by respectively bending the P-pole bus bar 3 and the N-pole bus bar 4 vertically at right angles along corresponding outer end surfaces of two of the three film capacitor cells, the two being disposed at opposite ends of the three film capacitor cells 2 disposed in parallel in the metal case 5, to extend to the outside of the metal case 5 from corresponding openings 5A and 5B opened in upper and lower surfaces of the metal case 5, respectively. Specifically, the end parts 3A and 4A at left of the respective P-pole bus bar 3 and N-pole bus bar 4 in FIG. 1 are bent downward at a right angle while overlapping each other to extend to the outside from the opening 5B opened on the lower surface of metal case 5, and the end parts 3B and 4B at right of the respective P-pole bus bar 3 and N-pole bus bar 4 in FIGS. 2A to 2C are bent upward at a right angle while overlapping each other to extend to the outside from opening 5A opened on the upper surface of metal case 5. When the end parts 3A and 4A as well as the end parts 3B and 4B of the respective P-pole bus bar 3 and N-pole bus bar 4 overlap each other, the P-pole bus bar 3 and the N-pole bus bar 4 each have low parasitic inductance.

The metal case 5 is made of aluminum light in weight or an aluminum alloy (ADC 12 or the like) in the shape of a rectangular box, and the resin 6 to be added in the metal case 5 uses an epoxy resin or the like having high thermal conductivity. The metal case 5 made of aluminum light in weight or an aluminum alloy as described above enables not only securing strength necessary for the capacitor module 1, but also reducing weight of the capacitor module 1.

The capacitor module 1 according to the present embodiment includes the metal case 5 having an inner surface on which an electrical insulating film 7 is formed with a thin thickness (e.g., 100 to 200 μm). The electrical insulating film 7 is formed simply and at low cost by spraying or applying insulating resin such as epoxy resin or silicon resin having high electrical insulation properties and heat resistance, or by immersing the metal case 5 in an insulating resin liquid.

As described above, when the electrical insulating film 7 with a thin thickness is formed on the inner surface of the metal case 5, the metal case 5 is electrically and reliably insulated from the three film capacitor cells 2 and the pair of bus bars 3 and 4 housed in the metal case 5 by the electrical insulating film 7, and thus an original function of each of the film capacitor cells 2 is not hindered. Such an effect can be obtained by forming the electrical insulating film 7 with a thin thickness on the inner surface of the metal case 5, so that the capacitor module 1 can be reduced in thickness as a whole to reduce thickness of the capacitor module 1. For example, a conventional capacitor module 101 illustrated in FIG. 10 has a thickness of 40 mm, whereas the capacitor module 1 according to the present embodiment has a thickness reduced to 26.1 to 26.2 mm, thereby acquiring a ratio calculated as follows: 26.2/40=0.655. Thus, a reduction in thickness of 34.5% can be achieved.

When the electrical insulating film 7 with a thin thickness is formed on the inner surface of the metal case 5 as described above, the electrical insulating film 7 may become thin or may break at a corner (e.g., the part A or the part B in FIG. 1) where the inner surface provided with the electrical insulating film 7 of the metal case 5 is bent at a right angle.

Thus, the present embodiment includes corners at each of which the inner surface of the metal case 5 is bent at a right angle, the corners having respective chamfers defined by R-shaped curved surfaces 5a and 5b as illustrated in FIGS. 2A and 3A, respectively, or having respective chamfers defined by cut surfaces 5c and 5d inclined at 45° as illustrated in FIGS. 2B and 3B, respectively. When the corners, at each of which the inner surface of the metal case 5 is bent at a right angle, have the respective chamfers defined by the R-shaped curved surfaces 5a and 5b or by the cut surfaces 5c and 5d as described above, the electrical insulating film 7 is stably formed with a predetermined thickness without breaking even in a part where the electrical insulating film 7 with a thin thickness becomes thinner or is likely to break.

Alternatively, resin guards 8 and 9 in an L-shape having high electrical insulation properties may be respectively interposed between a corner of the inner surface of the metal case 5 where the electrical insulating film 7 becomes thin or is likely to break and the P-pole bus bar 3 as illustrated in FIG. 2C, and between a corner of the inner surface of the metal case 5 and the N-pole bus bar 4 as illustrated in FIG. 3C. Here, the resin guards 8 and 9 are each made of polyphenylene sulfide (PPS) or the like having high electrical insulation properties, and the resin guards 8 and 9 each have a thickness set to a value with which a creepage distance of 5 mm required between the metal case 5 and each of the bus bars 3 and 4 can be secured.

When the resin guards 8 and 9 are respectively interposed between the corner of the inner surface of the metal case 5, where the electrical insulating film 7 becomes thin or is likely to break, and the P-pole bus bar 3, and between the corner and the N-pole bus bar 4 as described above, the resin guards 8 and 9 enable not only covering respective parts with the electrical insulating film 7 thinned or respective parts where the electrical insulating film 7 breaks, thereby reinforcing the parts, but also positioning the film capacitor cells 2 and the bus bars 3 and 4 accurately.

Next, a capacitor module according to a second embodiment of the present invention will be described below with reference to FIGS. 4 to 6.

Figure 4:
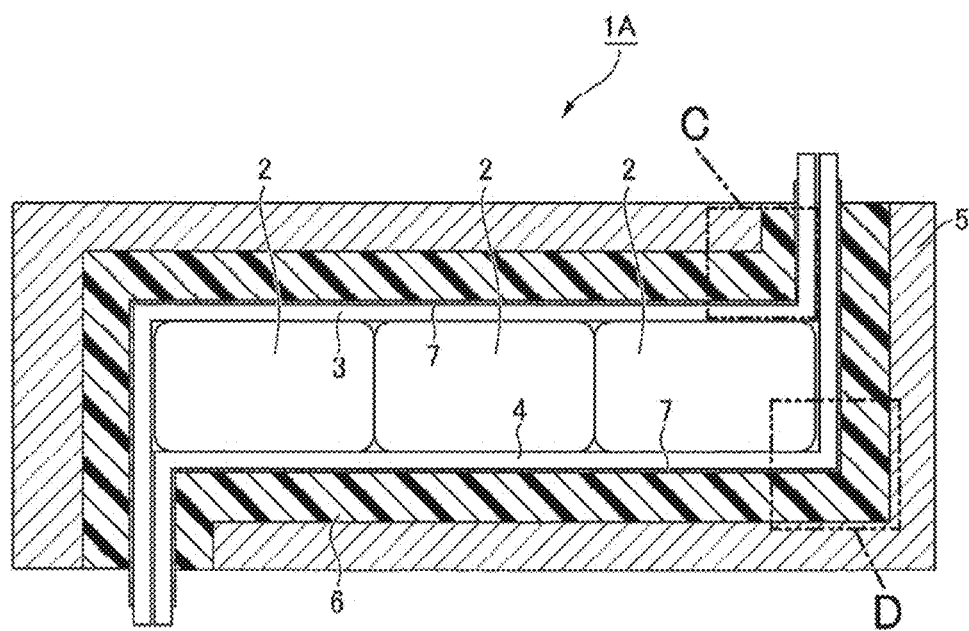
FIG. 4 is a longitudinal sectional view of a capacitor module according to a second embodiment of the present invention.

FIG. 4 is a longitudinal sectional view of the capacitor module according to the second embodiment of the present invention, FIGS. 5A to 5C are enlarged detailed views of a part C of FIG. 4, illustrating various processing forms of a corner of a bus bar, and FIGS. 6A to 6C are enlarged detailed views of a part D of FIG. 4, illustrating various processing forms of a corner of a bus bar. In these drawings, the same elements as those illustrated in FIGS. 1 to 3 are denoted by the same reference numerals, and duplicated description thereof will be eliminated below.

A capacitor module 1A according to the present embodiment is characterized in that an electrical insulating film 7 with a thin thickness is formed on an outer surface of a P-pole bus bar 3 and an outer surface of an N-pole bus bar 4, and is identical in other configurations to the capacitor module 1 according to the first embodiment. Additionally, the electrical insulating film 7 is identical in configuration, function, and method of formation to the electrical insulating film 7 in the first embodiment, and thus the capacitor module 1A according to the present embodiment can also be thinned as with the capacitor module 1 according to the first embodiment.

When the electrical insulating film 7 with a thin thickness is formed on outer surfaces of the P-pole bus bar 3 and the N-pole bus bar 4 as described above, the electrical insulating film 7 may become thin or may break at corners (e.g., a part C and a part D in FIG. 4) where the P-pole bus bar 3 and the N-pole bus bar 4 are bent at a right angle and the electrical insulating film 7 is formed.

Thus, the present embodiment includes the P-pole bus bar 3 and the N-pole bus bar 4 that have corners where the P-pole bus bar 3 and the N-pole bus bar 4 are bent at a right angle, the corners having respective chamfers defined by R-shaped curved surfaces 3a and 4a as illustrated in FIGS. 5A and 6A, respectively, or having respective chamfers defined by cut surfaces 3b and 4b inclined at 45° as illustrated in FIGS. 5B and 6B, respectively. When the corners, where the P-pole bus bar 3 and the N-pole bus bar 4 are bent at a right angle, have the respective chamfers defined by the R-shaped curved surfaces 3a and 4a or by the cut surfaces 3b and 4b as described above, the electrical insulating film 7 is stably formed with a predetermined thickness without breaking even in a part where the thin electrical insulating film 7 becomes thin or is likely to break.

Alternatively, resin guards 8 and 9 in an L-shape having high electrical insulation properties may be respectively interposed between a corner of the inner surface of the metal case 5 where the electrical insulating film 7 becomes thin or is likely to break and the P-pole bus bar 3 as illustrated in FIG. 5C, and between a corner of the inner surface of the metal case 5 and the N-pole bus bar 4 as illustrated in FIG. 6C. Here, the resin guards 8 and 9 are each made of polyphenylene sulfide (PPS) or the like having high electrical insulation properties, and the resin guards 8 and 9 each have a thickness set to a value with which a creepage distance of 5 mm required between the metal case 5 and each of the bus bars 3 and 4 can be secured.

When the resin guards 8 and 9 are each interposed between the corner of the inner surface of the metal case 5, where the electrical insulating film 7 becomes thin or is likely to break, and the P-pole bus bar 3 or the N-pole bus bar 4 as described above, the resin guards 8 and 9 enables not only covering respective parts where the electrical insulating film 7 becomes thin or respective parts where the electrical insulating film 7 breaks, thereby reinforcing the parts, but also positioning the film capacitor cells 2 and the bus bars 3 and 4 accurately.

Next, a capacitor module according to a third embodiment of the present invention will be described below with reference to FIG. 7.

Figure 7:
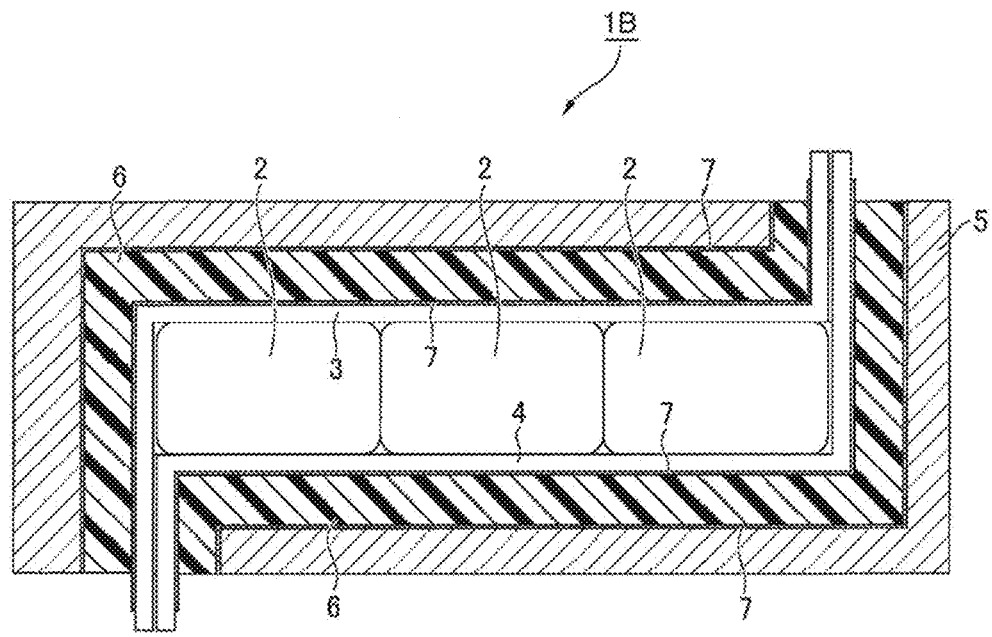
FIG. 7 is a longitudinal sectional view of a capacitor module according to a third embodiment of the present invention.

FIG. 7 is a longitudinal sectional view of the capacitor module according to the third embodiment of the present invention. In FIG. 7, the same elements as those shown in FIG. 4 are denoted by the same reference numerals, and duplicated description thereof will be eliminated below.

A capacitor module 1B according to the present embodiment includes an electrical insulating film 7 with a thin thickness that is formed on both an inner surface of a metal case 5 and an outer surfaces of a P-pole bus bar 3 and an N-pole bus bar 4, and thus the electrical insulating film 7 electrically insulates a film capacitor cell 2 from the metal case 5 more reliably. The capacitor module 1B according to the present embodiment also can be reduced in thickness by forming the electrical insulating film 7 with a thin thickness on both the inner surface of the metal case 5 and the outer surfaces of the P-pole bus bar 3 and the N-pole bus bar 4.

The capacitor module 1B according to the present embodiment also can prevent an occurrence of a defect of the electrical insulating film 7, such as a partial decrease in thickness or a disconnection in the middle, by taking the measures illustrated in FIGS. 2A to 2C and 3 for a corner where the inner surface of the metal case 5, on which the electrical insulating film 7 is formed, is bent at a right angle and taking the measures illustrated in FIGS. 5A to 5C and 6 for corners where the corresponding outer surfaces of the P-pole bus bar 3 and the N-pole bus bar 4, on which the electrical insulating film 7 is formed, are bent at a right angle.

Next, an inverter device and a motor module according to embodiments of the present invention will be described below with reference to FIGS. 8 and 9.

Figure 8:
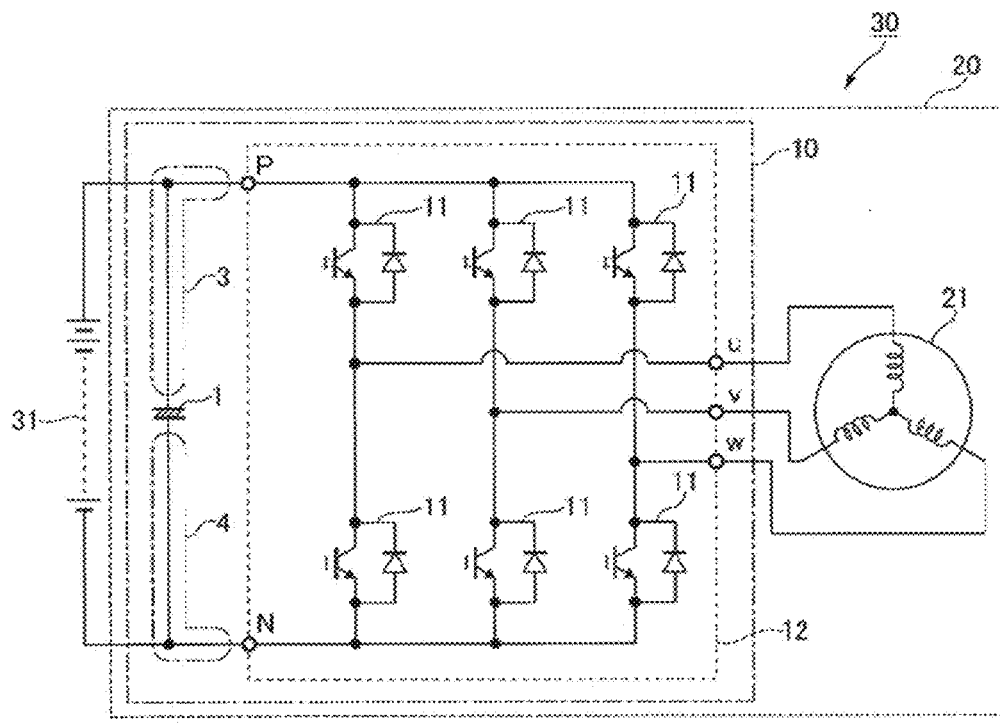
FIG. 8 is a circuit structure diagram of an electric drive system including an inverter device and a motor module according to the present invention.
Figure 9:
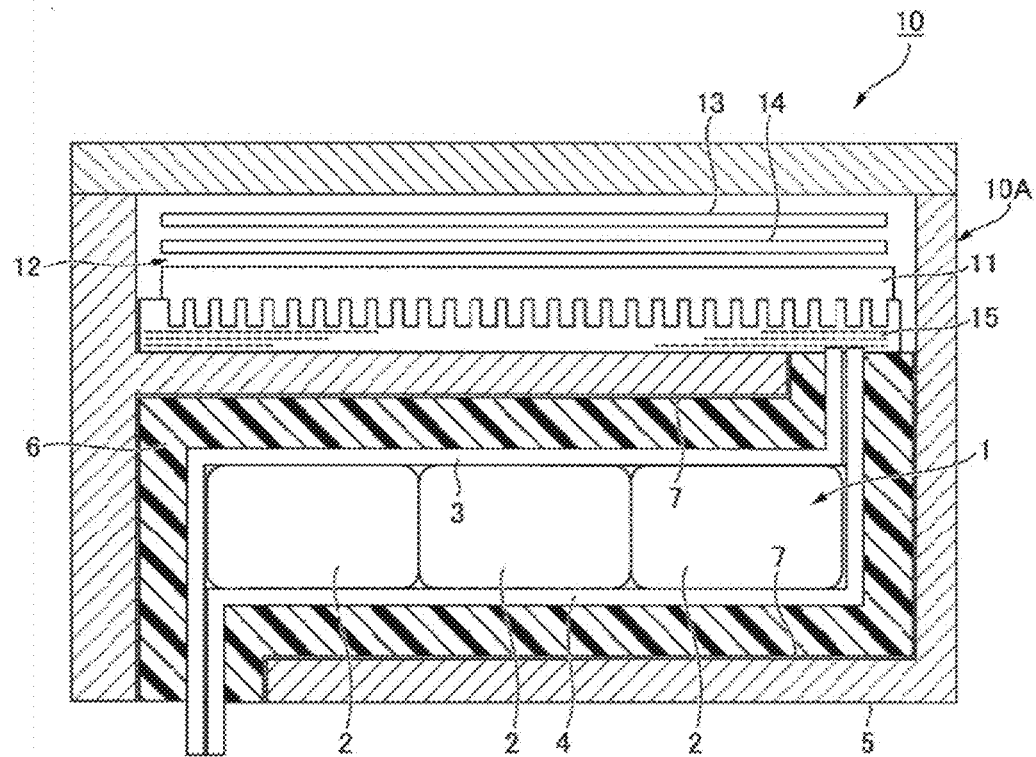
FIG. 9 is a longitudinal sectional view of the inverter device according to the present invention.

FIG. 8 is a circuit structure diagram of an electric drive system 30 including an inverter device 10 and a motor module 20 according to the present invention, and FIG. 9 is a longitudinal sectional view of the inverter device. The electric drive system 30 illustrated in FIG. 8 includes a battery 31 that is a DC power supply, the inverter device 10 that converts DC power supplied from the battery 31 into AC power, and an AC motor 21 that is rotationally driven by the AC power supplied from the inverter device 10. Here, the inverter device 10 and the AC motor 21 constitute the motor module 20 according to the present invention.

The inverter device 10 includes, for example, the capacitor module 1 illustrated in FIG. 1, and an inverter circuit 12 including a plurality of switching elements 11. Here, the capacitor module 1 smooths DC power supplied from the battery 31 to the plurality of switching elements 11 of the inverter circuit 12. FIG. 9 illustrates a specific configuration of the inverter device 10 including the capacitor module 1 provided with a metal case 5 that constitutes a part of an inverter case 10A serving as a housing of the inverter device 10. The inverter case 10A houses the switching elements 11 constituting the inverter circuit 12, a control circuit board 13, and a drive circuit board 14 in its upper part. The capacitor module 1 and the switching elements 11 are cooled by a cooling medium flowing through a cooling flow path 15.

As described above, the metal case 5 of the capacitor module 1 constitutes a part of the inverter case 10A, so that the inverter device 10 can be reduced in size to have a compact size, and the inverter case 10A can be reduced in material cost. Although the capacitor module 1 illustrated in FIG. 1 is used for the inverter device 10 in the present embodiment, the capacitor module 1A illustrated in FIG. 4 or the capacitor module 1B illustrated in FIG. 7 may be used instead of the inverter module 1.

Examples of the switching elements 11 provided in the inverter circuit 12 include an insulated gate bipolar transistor (IGBT), and a power metal oxide semiconductor-field effect transistor (MOS-FET).

As illustrated in FIG. 8, the inverter circuit 12 is electrically connected at a P-terminal and an N-terminal to a positive electrode and a negative electrode of the capacitor module 1 with a P-pole bus bar 3 and an N-pole bus bar 4, respectively. The inverter circuit 12 includes U, V, and W terminals serving as output-side terminals that are electrically connected to corresponding input terminals of the AC motor 21 for three-phase current.

The inverter device 10 configured as described above includes the capacitor module 1 reduced in thickness as described above, so that the entire inverter device can be reduced in size to have a compact size. The motor module 20 according to the present invention includes the inverter device 10 reduced in size and having a compact size, so that the entire motor module can be reduced in size to have a compact size as with the inverter device 10.

Next, a vehicle according to an embodiment of the present invention will be described below with reference to FIG. 10.

Figure 10:
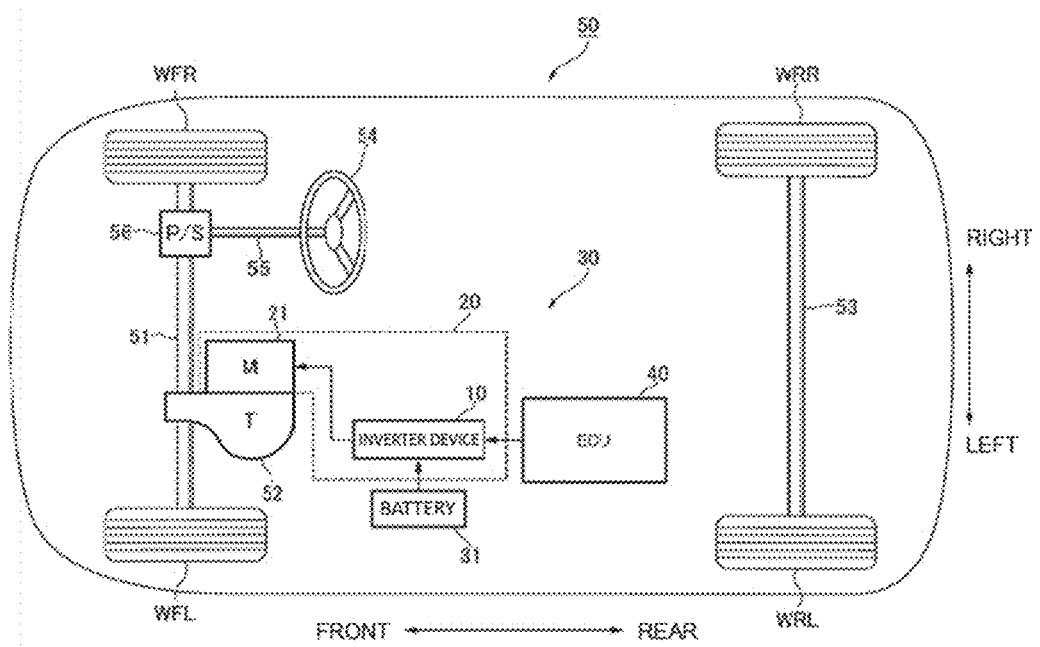
FIG. 10 is a plan view schematically illustrating a basic configuration of a vehicle according to the present invention.
Figure 11:
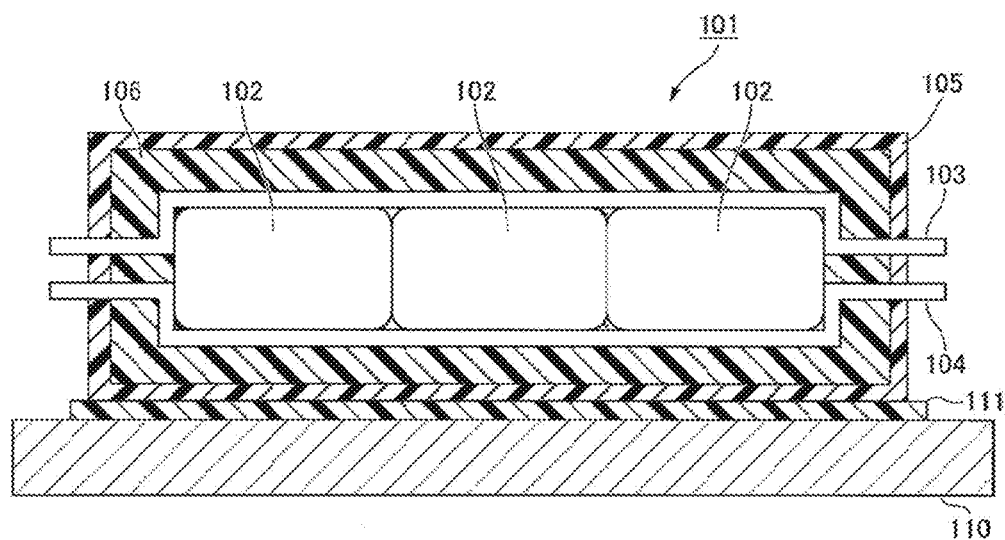
FIG. 11 is a longitudinal sectional view of a conventional capacitor module.

FIG. 10 is a plan view schematically illustrating a basic configuration of the vehicle according to the present invention, and illustrates a vehicle 50 being an electric vehicle (EV car) that travels using an AC motor 21 as a drive source. The vehicle 50 is equipped with an electric drive system 30 illustrated in FIG. 8.

More specifically, the vehicle 50 employs a front wheel drive system (FF system), and includes a vehicle body with a front section (a left end part in FIG. 10) in which an AC motor (M) 21 as a drive source and a transmission (T) 52 for changing speed of rotation of the AC motor (M) 21 to transmit the changed speed to a front axle 51 are disposed.

Here, the front axle 51 is disposed horizontally in a vehicle lateral direction, and is provided at its left and right ends with front wheels WFL and WFR serving as driving wheels, respectively. The vehicle body includes a rear section (a right end part in FIG. 10) in which a rear axle 53 is disposed parallel to the front axle 51 along the vehicle lateral direction, and the rear axle 53 is provided at its left and right ends with rear wheels WRL and WRR, respectively.

The AC motor 21 constitutes the motor module 20 together with the inverter device 10, and the inverter device 10 converts DC power supplied from the battery 31 that is a DC power supply into AC power to supply the AC power to the AC motor (M) 21, and then the AC motor (M) 21 is rotationally driven by the AC power. Here, a driving force (output) of the AC motor (M) 21 is controlled using the inverter device 10 operated in response to a control signal output from an electronic control unit (ECU) 40.

The vehicle 50 includes a steering wheel 54 constituting a steering system and being rotatably disposed in front of a driver's seat, and a steering shaft 55 extending obliquely from the steering wheel 54 toward the front of the vehicle and being connected to a power steering mechanism (P/S) 56 provided on the front axle 51.

As described above, the vehicle 50 according to the present embodiment includes the motor module 20 reduced in size and having a compact size as described above in the electric drive system 30 as a drive system, so that the motor module 20 is improved in mountability on the vehicle 50.

Although in the present embodiment, an aspect in which the present invention is applied to an electric vehicle (EV vehicle) has been described, the present invention is similarly applicable to a hybrid vehicle (EHV vehicle) including an engine and an AC motor as a drive source.

Additionally, the present invention is not limited to the embodiments described above, and various modifications can be made within the scope of the technical idea described in the scope of claims, the specification, and the drawings.

Features of the above-described preferred embodiments and the modifications thereof may be combined appropriately as long as no conflict arises.

While preferred embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

What is claimed is:

1. A capacitor module comprising:
   a plurality of film capacitor cells;
   a pair of bus bars that electrically connects the film capacitor cells in parallel;
   a metal case that houses the plurality of film capacitor cells and the pair of bus bars;
   a resin added in the metal case to integrate the plurality of film capacitor cells and the pair of bus bars; and
   an electrical insulating film formed at least on an inner surface of the metal case or each of outer surfaces of the pair of bus bars.

2. The capacitor module according to claim 1, wherein the metal case is made of aluminum or an aluminum alloy.

3. The capacitor module according to claim 1, wherein the electrical insulating film is formed by spraying or applying an insulating resin, or by immersing the metal case or the pair of bus bars in a resin liquid.

4. The capacitor module according to claim 1, wherein at least a corner of the inner surface of the metal case or each of corners of the pair of bus bars has a chamfer defined by an R-shaped curved surface or a cut surface.

5. The capacitor module according to claim 1, further comprising:
   a resin guard having electrical insulation properties interposed between a corner of the inner surface of the metal case or each of corners of the pair of bus bars and the electrical insulating film.

6. An inverter device configured to convert DC power supplied from a DC power supply into AC power, the inverter device comprising:
   the capacitor module according to claim 1;
   an inverter circuit that converts the DC power into the AC power; and
   an inverter case that is partly formed by the metal case of the capacitor module.

7. A motor module comprising:
   the inverter device according to claim 6; and
   an AC motor rotationally driven by AC power supplied from the inverter device.

8. A vehicle comprising:
   an electric drive system provided with the motor module according to claim 7.

9. The capacitor module according to claim 1, wherein the metal case includes an opening through which the pair of bus bars extend to an outside of the metal case.

10. The capacitor module according to claim 9, wherein the plurality of film capacitor cells is arranged in a first direction, and
    each of the pair of bus bars includes
    a first part extending along the plurality of film capacitor cells in the first direction, and a second part extending, in a second direction crossing the first direction, from the first part to the outside of the metal case through the opening.

11. The capacitor module according to claim 10, wherein a corner defined by the first part and the second part has a chamfer defined by an R-shaped curved surface or a cut surface.

12. The capacitor module according to claim 11, further comprising:
a resin guard having an electrical insulation property interposed between the corner and the electrical insulating film.

* * * * *